United States Patent
Petrovic (10) Patent No.: US 9,989,029 B2
(45) Date of Patent: Jun. 5, 2018

(54) METHOD AND DEVICE FOR DETERMINING A CHARGE AIR MASS FLOW RATE

(71) Applicant: Ford Global Technologies, LLC, Dearborn, MI (US)

(72) Inventor: Simon Petrovic, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 14/607,841

(22) Filed: Jan. 28, 2015

(65) Prior Publication Data

US 2015/0219052 A1   Aug. 6, 2015

(30) Foreign Application Priority Data

Feb. 4, 2014   (DE) .................. 10 2014 201 947

(51) Int. Cl.
| | |
|---|---|
| *F02M 65/00* | (2006.01) |
| *F02B 37/12* | (2006.01) |
| *F02D 41/00* | (2006.01) |
| *F02D 41/18* | (2006.01) |
| *F02D 41/14* | (2006.01) |

(52) U.S. Cl.
CPC ........... *F02M 65/001* (2013.01); *F02B 37/12* (2013.01); *F02D 41/0007* (2013.01); *F02B 2037/122* (2013.01); *F02D 41/18* (2013.01); *F02D 2041/1416* (2013.01); *F02D 2041/1433* (2013.01); *F02D 2200/0402* (2013.01); *Y02T 10/144* (2013.01)

(58) Field of Classification Search
CPC ............... Y02T 10/144; F02D 41/0007; F02D 2200/0402; F02D 2041/1416; F02D 2041/1433; F02B 2037/122; F02B 37/12

USPC ....................................................... 73/114.48
See application file for complete search history.

(56) References Cited

U.S. PATENT DOCUMENTS 6,035,639 A * 3/2000 Kolmanovsky ......... F02B 37/24
                                                    60/605.2
6,155,050 A * 12/2000 Blanz ...................... F02B 37/18
                                                    60/603

(Continued)

FOREIGN PATENT DOCUMENTS

| | | |
|---|---|---|
| CN | 102022182 A | 4/2011 |
| DE | 102007030233 A1 | 1/2009 |

(Continued)

OTHER PUBLICATIONS

Petrovic, Simon, "Mass Flow Rate Determination," U.S. Appl. No. 14/639,722, filed Mar. 5, 2015, 33 pages.

Primary Examiner — Freddie Kirkland, III
(74) Attorney, Agent, or Firm — Julia Voutyras; McCoy Russell LLP (57) ABSTRACT

A method for determining charge air mass flow rate comprises a turbocharger speed sensor with a closed loop observer that is based on a modeled turbocharger revolution rate. An open loop charge air mass flow rate is determined in a characteristic field stored in an engine controller and is corrected by the scaled difference between the measured and modeled turbocharger revolution rates. The corrected closed loop charge air mass flow is fed back to model the subsequent turbocharger revolution rate and to update the open loop charge air mass flow rate in the characteristic field.

15 Claims, 5 Drawing Sheets

(56) References Cited

U.S. PATENT DOCUMENTS

| | | | | |
|---|---|---|---|---|
| 7,089,738 B1* | 8/2006 | Boewe | ............... | F02B 37/24 |
| | | | | 123/568.21 |
| 7,296,562 B2* | 11/2007 | Withrow | ............... | F01N 11/002 |
| | | | | 123/559.1 |
| 7,762,068 B2* | 7/2010 | Tabata | ............... | F02D 41/0007 |
| | | | | 60/608 |
| 8,191,369 B2* | 6/2012 | Geyer | ............... | F02B 37/16 |
| | | | | 123/568.11 |
| 8,201,442 B2* | 6/2012 | Osburn | ............... | F02D 41/0072 |
| | | | | 73/114.74 |
| 8,307,645 B2* | 11/2012 | Mischler | ............... | F02B 39/16 |
| | | | | 415/17 |
| 8,769,936 B2* | 7/2014 | Petrovic | ............... | F01N 11/00 |
| | | | | 60/276 |
| 9,194,319 B2* | 11/2015 | Mischler | ............... | F02D 41/18 |
| 2007/0095063 A1* | 5/2007 | Mischler | ............... | F02B 39/16 |
| | | | | 60/608 |
| 2015/0275805 A1* | 10/2015 | Petrovic | ............... | G01F 1/86 |
| | | | | 701/102 |

FOREIGN PATENT DOCUMENTS

| | | | |
|---|---|---|---|
| EP | 1024262 A2 | 8/2000 |
| EP | 2295761 A1 | 3/2011 |
| WO | 2008027654 A3 | 3/2008 |
| WO | 2009023404 A1 | 2/2009 |

\* cited by examiner

METHOD AND DEVICE FOR DETERMINING A CHARGE AIR MASS FLOW RATE

CROSS REFERENCE TO RELATED APPLICATIONS

The present application claims priority to German Patent Application No. 102014201947.8, filed Feb. 4, 2014, the entire contents of which are hereby incorporated by reference for all purposes.

FIELD

The present disclosure relates to a method for determining the charge air mass flow rate of an internal combustion engine with an exhaust gas turbocharger, according to the preambles of the independent claims and as known from DE 10 2007 030 233 A1.

BACKGROUND\SUMMARY

Engines may use a turbocharger to improve engine torque/power output density. In one example, a turbocharger may include a compressor and a turbine connected by a drive shaft, where the turbine is coupled to an exhaust manifold side and the compressor is coupled to an intake manifold side. In this way, the exhaust-driven turbine supplies energy to the compressor to increase the pressure in the intake manifold (e.g. boost, or boost pressure) and to increase the flow of air into the engine. Monitoring the air mass flow rate into the engine may help determine fuel injection amount for example, or may assist in controlling exhaust gas recirculation.

One example to address monitoring air mass flow rate is to use mass air flow sensors such as a hot wire sensor, wherein the change of resistance of the wire responsive to temperature is calibrated into an air mass flow rate by a controller.

However, the inventors have recognized potential issues with such systems. Mass air flow sensors such as hot wire sensors may form deposits from contaminants, especially when operating in urban areas, thereby decreasing in measurement accuracy over operational time.

One potential approach to at least partially address some of the above issues includes a method for determining a charge air mass flow rate, herein also air mass flow rate. The method comprises determining an open loop air mass flow rate from a characteristic field stored in an engine controller, wherein the open loop rate is a function of a measured pressure compressor ratio and measured turbocharger revolution rate, i.e. turbine speed. The method further comprises modeling an associated turbocharger revolution rate and determining a closed loop air mass flow rate, wherein the closed loop air mass flow rate is the sum of the open loop rate and an offset value.

In one example, closed loop air mass flow rate is determined repeatedly, wherein each case the previously obtained closed loop air mass flow rate is used to model the turbocharger revolution rate. In turn, a controller may adjust other engine parameters, such as fuel injection time, fuel mass balance, and air-fuel ratio, based on the updated charge air mass flow rate. In this way, each measurement of the charge air mass flow rate is updated and corrected upon successive cycles, producing more accurate measurements than those determined solely on open loop values, for example. Further, this method of determining charge air mass flow rate may be done without a mass air flow sensor for example, and therefore measurements do not depend on conditions that may degrade sensors upon deposition.

In another example, a method comprises adjusting an engine actuator responsive to an air mass flow rate, the air mass flow rate not based on a mass airflow sensor and based on an error between an estimated turbine speed and a measured turbine speed, the estimated turbine speed based on a load balance on a turbocharger shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The term internal combustion engine includes here both diesel engines and also gasoline engines, both for fossil and also alternative fuels, and also hybrid combustion engines such as those that use different combustion processes at different operating points of the internal combustion engine or that are combined with alternative drives such as fuel cell drives or electric drives.

In recent years a development to charged engines has taken place, wherein the charging is a method for increasing power, with which the air required for the engine combustion process is compressed. For example, an exhaust gas turbocharger is used, in which a compressor and a turbine are disposed on the same shaft. A hot flow of exhaust gas is fed to the turbine, expands in said turbine with the output of energy, whereby the shaft is set in rotation. The energy output from the flow of exhaust gas to the turbine and finally to the shaft is used to drive the compressor that is also disposed on the shaft. The compressor transports and compresses the charge air fed to it, whereby charging of the cylinder of the internal combustion engine is achieved. During this, the pressure of the charge air flow increases from a lower pressure upstream of the compressor to a higher pressure downstream of the compressor.

Charging may be a suitable means for increasing the power of an internal combustion engine with constant stroke or for reducing the stroke at constant power for example. Charging may result in an increase of the power/installation space ratio and a more favorable performance measure. For given vehicle boundary conditions, the load spectrum can thus be shifted to higher loads, at which the specific fuel consumption is lower. The latter is also referred to as downsizing.

Knowledge of the magnitude of the charge air mass flow rate may be necessary for controlling a charged internal combustion engine, on the one hand for dimensioning the amount of fuel to be added to the charge air and on the other hand for controlling exhaust gas recirculation that may be provided.

The charge air mass flow rate is conventionally determined by means of an air mass flow sensor. For example, a heatable resistance wire disposed in the induction pipe is used as the air mass flow sensor. The temperature of the resistance wire changes as a result of the charge air flowing past. The resulting change in resistance of the wire is used for determining the charge air mass flow rate.

The charge air mass flow rate thus determined may, however, deviate markedly from the actually delivered charge air mass flow rate. One reason for this is that the sensor becomes fouled with increasing operating time, wherein deposits form on the sensor. Said fouling, which particularly occurs when travelling in town, has a significant effect on the measurement accuracy of an air mass flow sensor with a resistance wire.

In order to obtain a more accurate and more stable value for the charge air mass flow rate, it is proposed in the above-mentioned DE 10 2007 030 233 A1 to read the charge air mass flow rate from a characteristic field stored in the engine controller, which gives the charge air mass flow rate associated with a measured compressor pressure ratio and a measured turbocharger revolution rate. This means that the charge air mass flow rate, merely controlled in an open control loop, is determined from the compressor pressure ratio and the turbocharger revolution rate and is thus referred to herein as the open loop charge air mass flow rate.

Sensors for detecting the turbine revolution rate are available and are already used in larger motor vehicles as standard, primarily to protect against excessively high revolution rates. The compressor pressure ratio is the pressure ratio across the compressor of the exhaust gas turbocharger and can be determined from the pressure measurement values before and after the compressor of the exhaust gas turbocharger.

The characteristic field is stored in the engine controller in general as a 2D lookup table, for example, which has been produced on a test bench on which all values of the compressor pressure ratios and the turbocharger revolution rate have been run through under practical conditions.

With the legal emission limits becoming stricter, it is useful to know the charge air mass flow rate as accurately as possible. Monitoring charge air mass flow rate is especially useful during partial load operation of internal combustion engines, in which the standard emission test is carried out, wherein the emission limits may be complied with by using exactly regulated exhaust gas recirculation.

The method of simply reading the charge air mass flow rate from a characteristic field against the compressor pressure ratio and the turbocharger revolution rate suffers among other things from the fact that the thus determined charge air mass flow rate depends very sensitively on the turbocharger revolution rate, so that its measurement error influences the result disproportionately.

The object of the present application is to be able to still more accurately determine the actual value of the charge air mass flow rate of an internal combustion engine during the operation of a motor vehicle equipped therewith.

According to the present application an associated turbocharger revolution rate is modeled from the measured compressor pressure ratio and an input charge air mass flow rate. A closed loop charge air mass flow rate is calculated as the sum of the open loop charge air mass flow rate and of an offset value, wherein the offset value is a scaled difference between the measured turbocharger revolution rate and the modeled turbocharger revolution rate. The calculation of the closed loop charge air mass flow rate is carried out repeatedly, wherein in each case the previously obtained closed loop charge air mass flow rate is used in the modeling of the turbocharger revolution rate. The closed loop charge air mass flow rate is thus determined using a closed control loop.

That is to say the present application includes the use of an observer, which is a system in control technology that reconstructs non-measurable variables from known input variables and output variables of an observed reference system. For this process the observer simulates the observed reference system as a model and contains a regulator that adjusts the measurable state variables. In this sense an observer is a reference-controlled synthesizer.

In the present application, the turbocharger revolution rate is advantageously measured with a revolution rate sensor. The compressor pressure ratio is the pressure ratio across the compressor of the exhaust gas turbocharger and is advantageously determined from pressure measurement values before and after the compressor of the exhaust gas turbocharger. The pressures may be measured by sensors located upstream and downstream of the compressor, for example. The characteristic field is advantageously represented by a 2D lookup table that has been previously produced on a test bench.

In one embodiment the modeled turbocharger revolution rate is calculated analytically using a model for the dependency of the turbocharger revolution rate on the compressor pressure ratio and the charge air mass flow rate, preferably using the engine controller.

In one embodiment the offset value is the difference between the measured turbocharger revolution rate and the modeled turbocharger revolution rate that is multiplied by a scaling factor, wherein the scaling factor can be constant, process-controlled, or adaptive. Advantageously, the scaled difference between the measured turbocharger revolution rate and the modeled turbocharger revolution rate is limited by an upper and a lower limit value before being used as the offset value.

Figure 1:
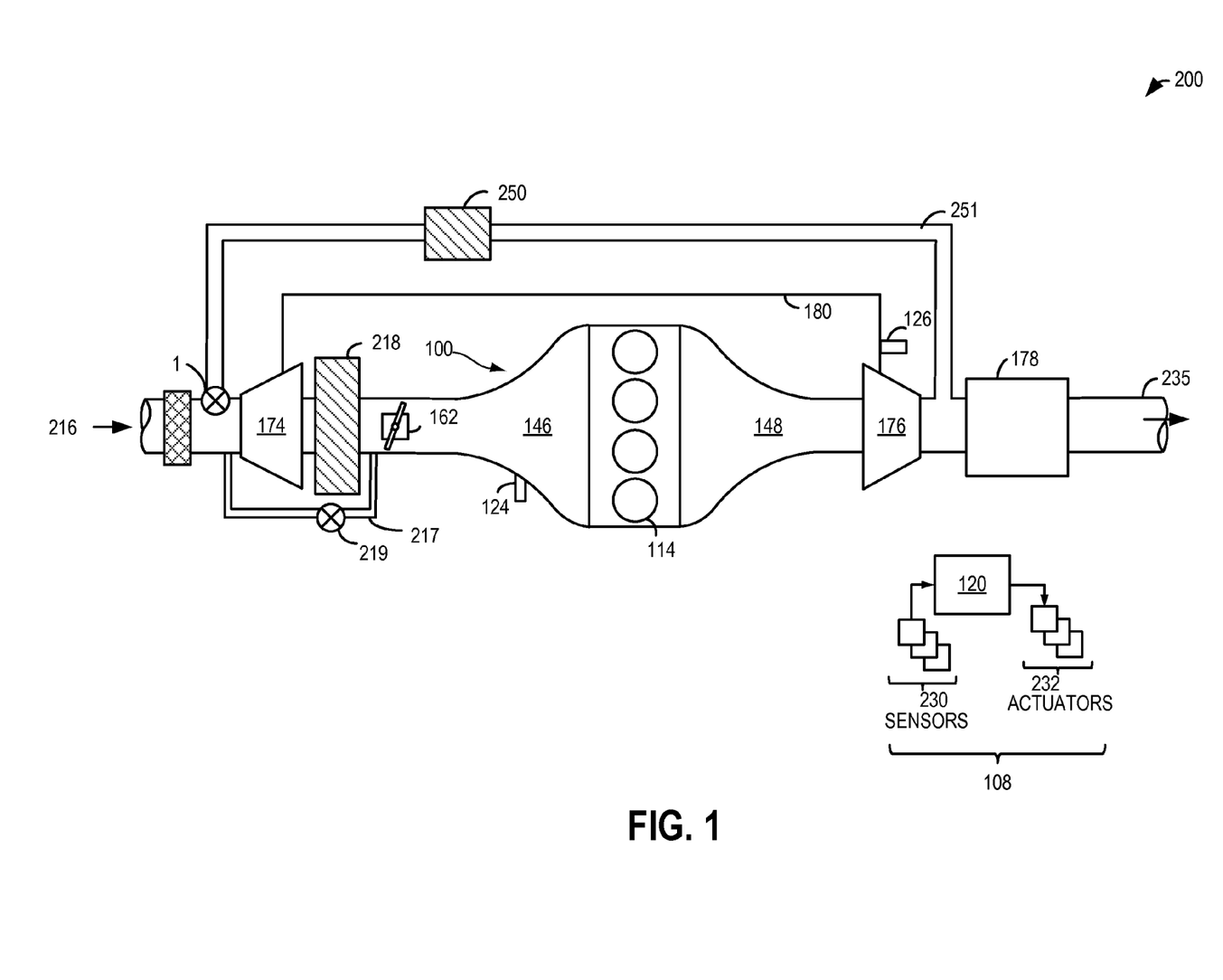
FIG. 1 schematically depicts an example vehicle system including a turbocharger system.

FIG. 1 shows a schematic diagram of a vehicle system 200 with a multi-cylinder engine system 100 coupled in a motor vehicle in accordance with the present disclosure. As depicted in FIG. 1, direct injection turbocharged internal combustion engine 100 includes a controller 120 which receives inputs from a plurality of sensors 230 and sends outputs from a plurality of actuators 232. Engine 100 further includes cylinders 114 coupled to intake passage 146 and exhaust passage 148. Intake passage 146 may include throttle 162. Exhaust passage 148 may include emissions control device 178. Engine 100 is shown as a boosted engine, coupled to a turbocharger with compressor 174 connected to turbine 176 via shaft 180. In one example, the compressor and turbine may be coupled within a twin scroll turbocharger. In another example, the turbocharger may be a variable geometry turbocharger, where turbine geometry is actively varied as a function of engine speed and other operating conditions. Further, there may be a turbocharger speed sensor 126 that measures speed or rotational speed of turbine 176 and transmits the measurement to controller 120.

The compressor 174 is coupled through charge air cooler (CAC) 218 to throttle 162. The CAC 218 may be an air-to-air or air-to-water heat exchanger, for example. From the compressor 174, the hot compressed air charge enters the inlet of the CAC 218, cools as it travels through the CAC, and then exits to pass through the throttle valve 162 to the intake manifold 146. Ambient airflow 216 from outside the vehicle may enter engine 100 and pass across the CAC 218 to aid in cooling the charge air. A compressor bypass line 217 with a bypass valve 219 may be positioned between the inlet of the compressor and outlet of the CAC 218. The controller 120 may receive input from compressor inlet sensors such as compressor inlet air temperature, inlet air pressure, etc., and may adjust an amount of boosted air-charge recirculated across the compressor for boost control. For example, the bypass valve may be normally closed to aid in boost development. Further, controller 120 may receive input from compressor and turbine sensors such as compressor inlet pressure and temperature, compressor outlet pressure, turbine inlet pressure, turbine outlet pressure and temperature, etc., and may determine charge air mass flow rate in part from these inputs, as described in FIGS. 2-5. There may be pressure and/or temperature sensors located upstream and downstream of the turbine, and upstream and downstream of the compressor, for example. In another example, the sensors upstream and downstream of the turbine and compressor may measure both pressure and temperature. In the embodiment shown in FIG. 1, the pressure of the air charge within the intake manifold is sensed by manifold air pressure (MAP) sensor 124

Intake passage 146 is coupled to a series of cylinders 114 through a series of intake valves. The cylinders 114 are further coupled to exhaust passage 148 via a series of exhaust valves. In the depicted example, a single intake passage 146 and exhaust passage 148 are shown. In another example, the cylinders may include a plurality of intake passages and exhaust passages to form an intake manifold and exhaust manifold respectively. For example, configurations having a plurality of exhaust passages may enable effluent from different combustion chambers to be directed to different locations in the engine system.

The exhaust from exhaust passage 148 is directed to turbine 176 to drive the turbine. When a reduced turbine torque is desired, some exhaust may be directed through a wastegate (not shown) to bypass the turbine. The combined flow from the turbine and wastegate flows through the emission control device 178. One or more aftertreatment devices may be configured to catalytically treat the exhaust flow, thereby reducing an amount of one or more substances in the exhaust. The treated exhaust may be released into the atmosphere via exhaust conduit 235.

Depending on the operating conditions of the engine, some exhaust gas may be diverted from the exhaust passage downstream of the turbine 176 to an exhaust gas recirculation (EGR) passage 251, through EGR cooler 250 and EGR valve 1 to the inlet of the compressor 174. The EGR passage 251 is depicted as a low pressure (LP) EGR system.

Figure 2:
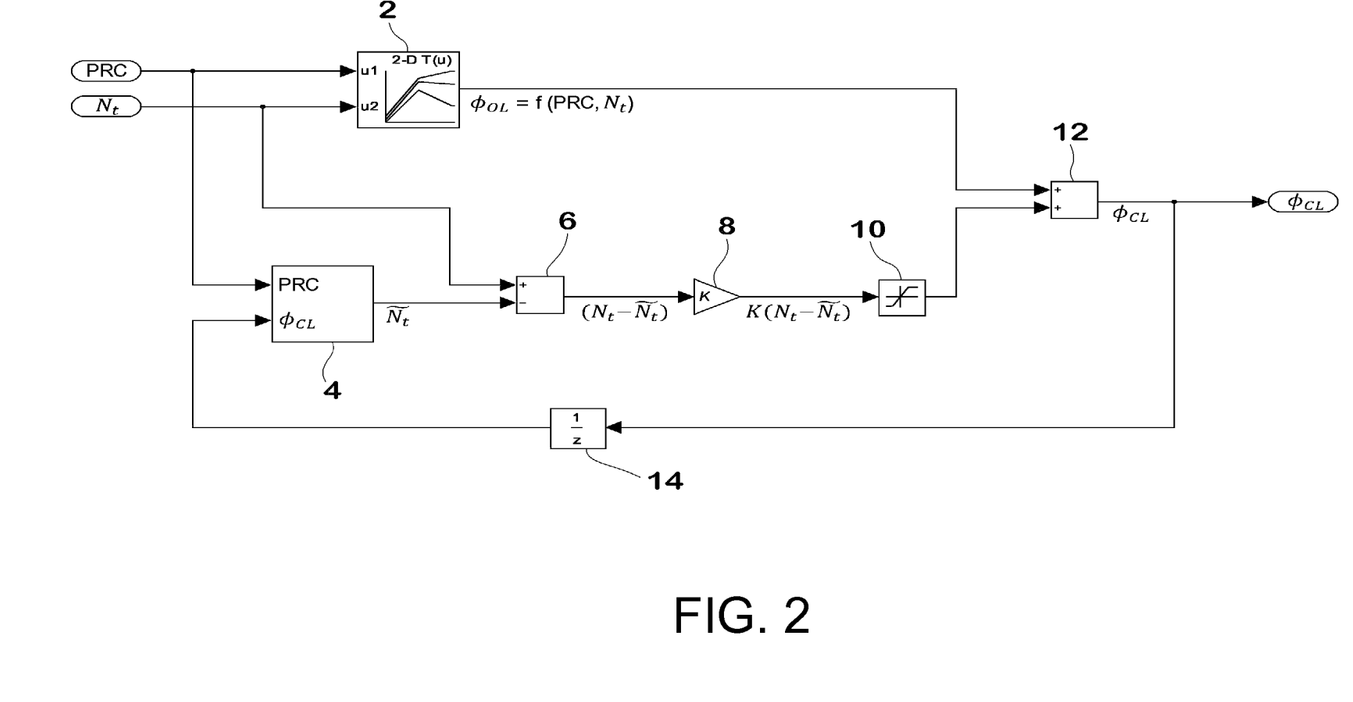
FIG. 2 shows a block diagram of a method for determining a charge air mass flow rate.

In FIG. 2 a measured compressor pressure ratio PRC and a measured turbocharger revolution rate Nt of an exhaust gas turbocharger of a motor vehicle internal combustion engine may be entered in a 2D lookup table 2, which has previously been produced on a test bench, so that the 2D lookup table 2 gives the charge air mass flow rates associated with each compressor pressure ratio PRC and each turbocharger revolution rate Nt. Accordingly, the 2D lookup table 2 produces an open loop charge air mass flow rate ΦOL as a function of PRC and Nt.

A modeler 4 implemented in an engine controller calculates analytically, using a suitably selected model, the modeled turbocharger revolution rate Ñt that may result for the compressor pressure ratio PRC and an input open loop charge air mass flow rate ΦCL, wherein ΦCL can be set to various initial values. The model may be selected based on power balance, torque balance, and/or load balance, for example.

The measured turbocharger revolution rate Nt and the modeled turbocharger revolution rate Ñt are subtracted one from the other in a subtractor 6, and the obtained difference Nt−Ñt is multiplied in a multiplier 8 with a scaling factor (K), which may be a suitably selected constant or a process-controlled or adaptively adjusted value. A clipper 10 limits the scaled difference K(Nt−Ñt) to an upper and a lower limit value, which may be selected as suitable saturation values.

An adder 12 adds the open loop charge air mass flow rate ΦOL and the K(Nt−Ñt) as an offset value, which results in a new closed loop charge air mass flow rate ΦCL, which on the one hand may be output as the charge air mass flow rate determined with the method and on the other hand may be input to the modeler 4 again. The calculation of the closed loop charge air mass flow rate ΦCL may be carried out repeatedly, wherein in each case the previously obtained closed loop charge air mass flow rate ΦCL is entered into the modeler 4 by delaying the charge air mass flow rate ΦCL output by the adder 12 by one step in the z-1-block 14. The measurement variables input into the model can include further measurable variables, e.g. the temperature at the input of the compressor, temperature at the output of the turbine, pressure at the input and output of the compressor and turbine, etc.

Figure 3:
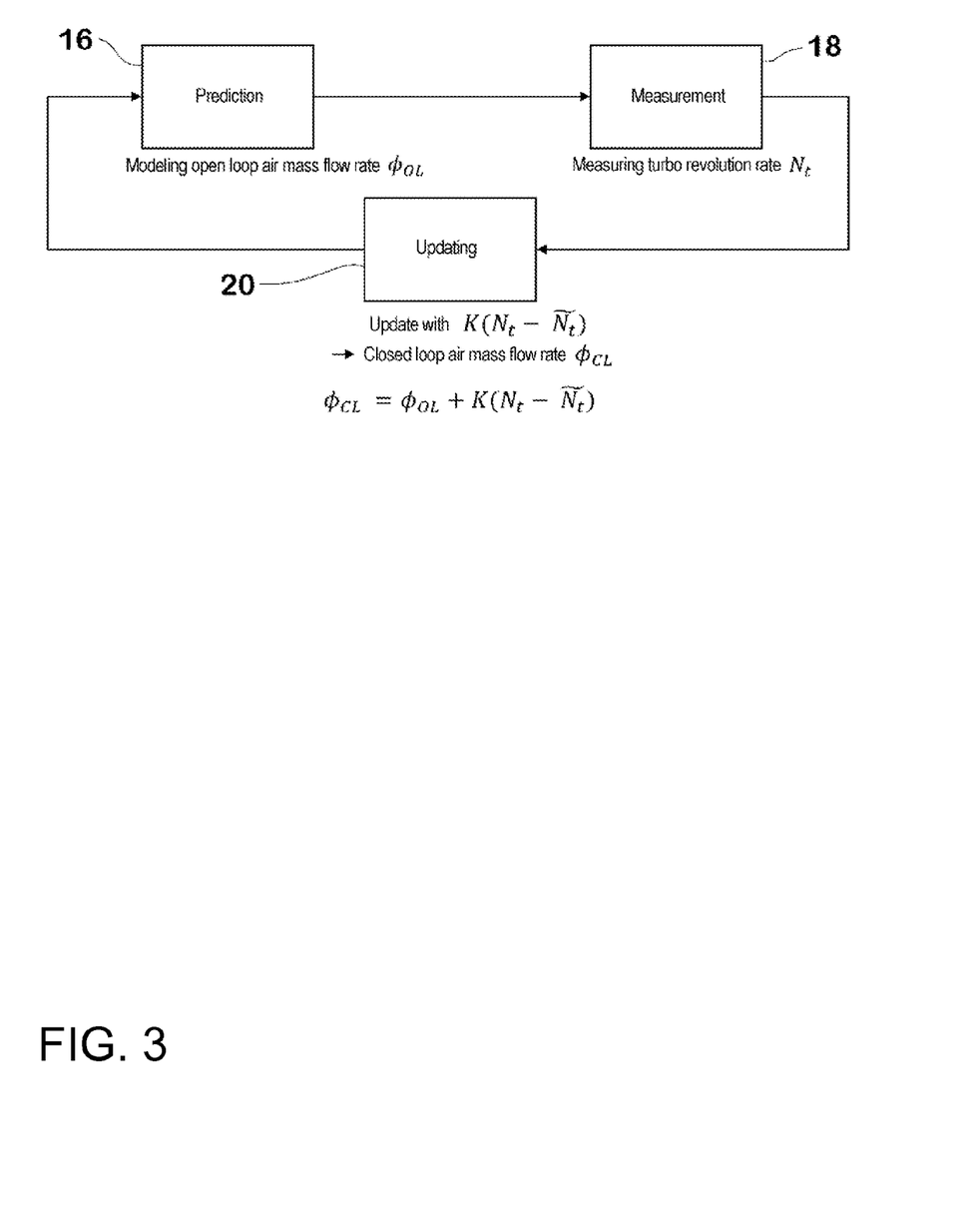
FIG. 3 shows the structure of the observer used in determining a charge air mass flow rate.

The observer structure shown in FIG. 3 comprises three steps carried out in a loop, namely a step 16 for modeling the open loop charge air mass flow rate ΦOL, a step 18 for measuring the turbocharger revolution rate Nt and a step 20, with the difference K(Nt−Ñt), which is an error term for the turbocharger revolution rate, for synthesizing the closed loop charge air mass flow rate ΦCL. With an increasing number of passes through the loop an ever more stable open loop charge air mass flow rate ΦOL results, being a more accurate value for the actual charge air mass flow rate than the open loop charge air mass flow rate ΦOL.

Figure 4:
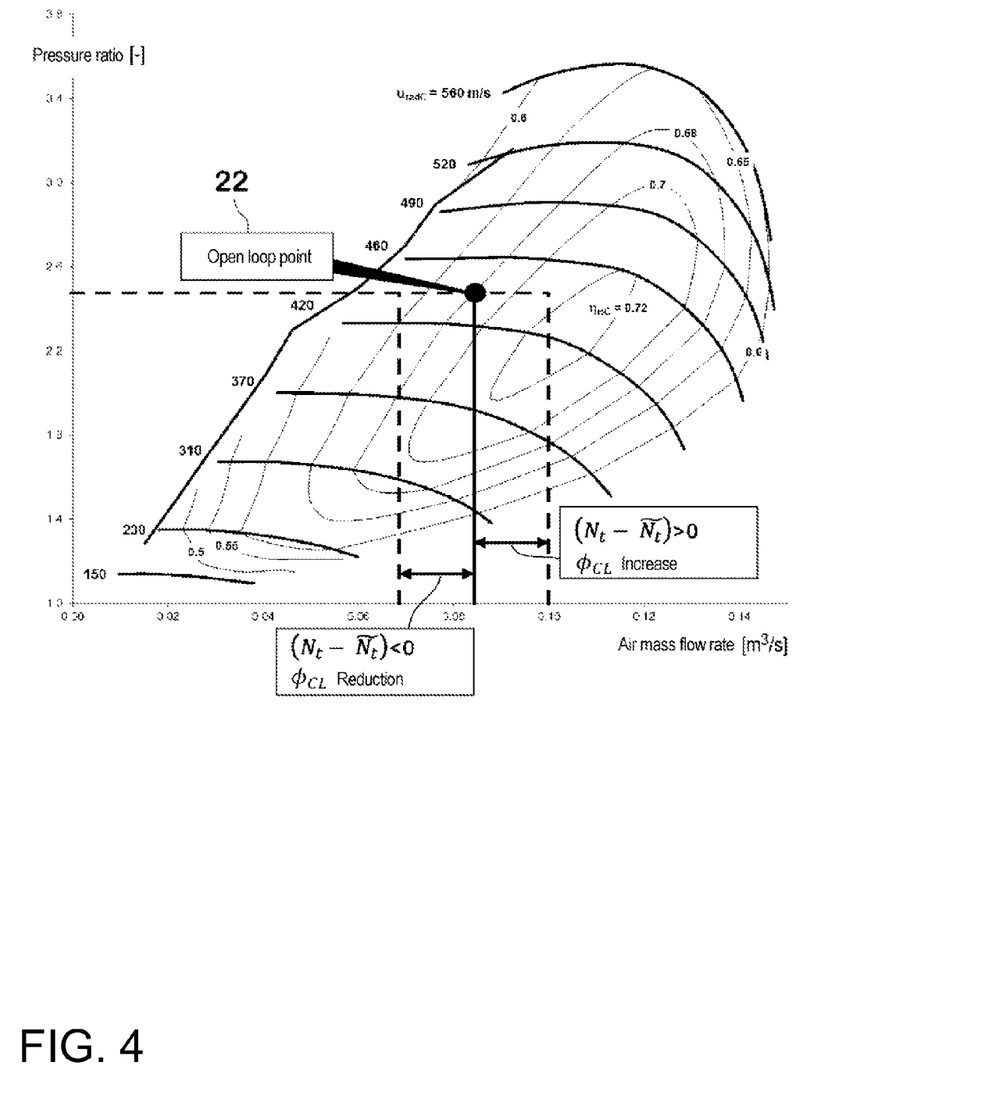
FIG. 4 shows a typical compressor characteristic field with the charge air mass flow rate on the abscissa and the compressor pressure ratio on the ordinate.

FIG. 4 shows a typical compressor characteristic field for illustration of the charge air mass flow rate offset resulting from an estimation error of the turbocharger revolution rate. As illustrated using FIG. 4, an open loop working point 22 may be set by means of the 2D lookup table 2 that is updated by the observer illustrated in FIG. 3, wherein three cases are to be distinguished: if K(Nt−Ñt)>0, the open loop charge air mass flow rate ΦOL is increased; if K(Nt−Ñt)=0, it is not updated; and if K(Nt−Ñt)<0, the open loop charge air mass flow rate ΦOL is reduced, as illustrated in FIG. 4. The compressor pressure ratio PRC is generally variable during the updating.

Figure 5:
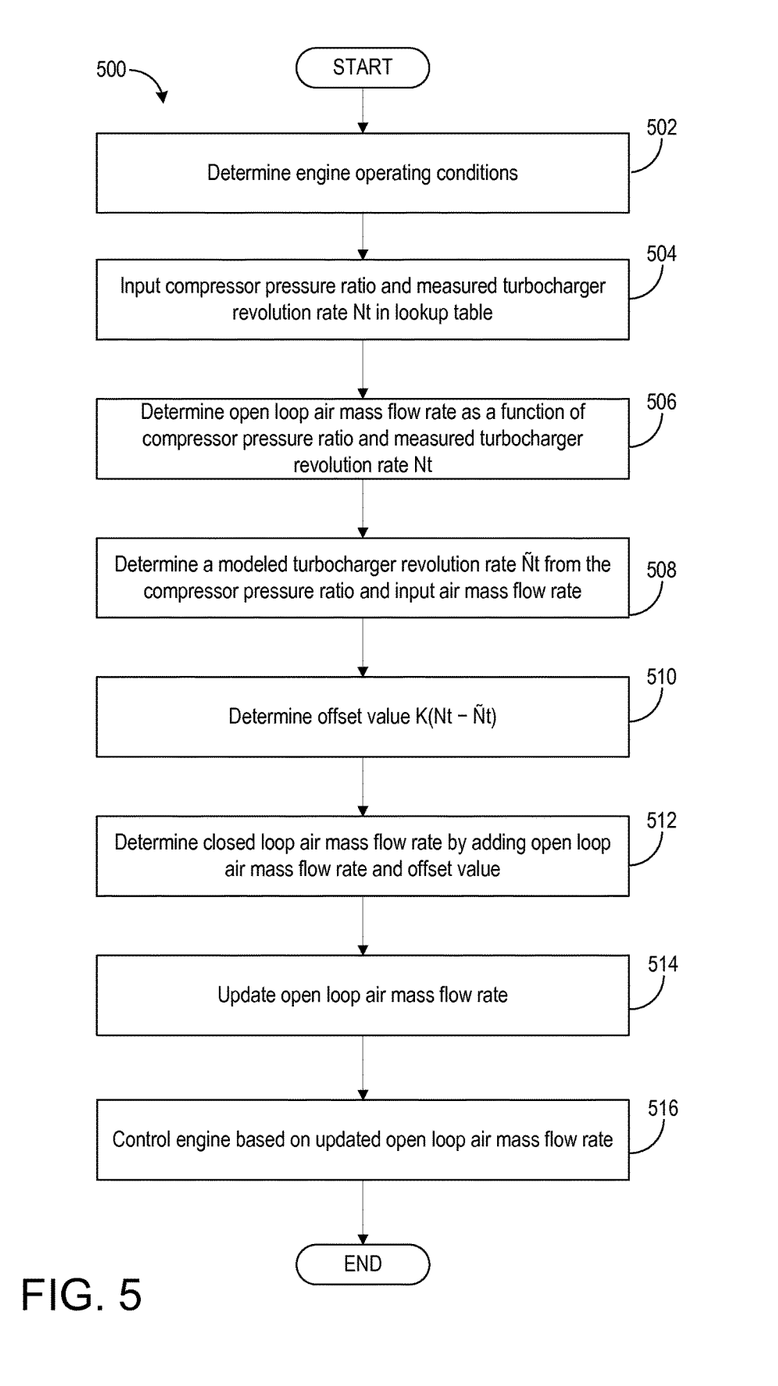
FIG. 5 shows an example flow chart illustrating a routine for determining a charge air mass flow rate using the described observer.

Turning now to FIG. 5, a method 500 may be executed by an engine controller (e.g., controller 120) for determining charge air mass flow rate in an internal combustion engine. In one example, a method of determining charge air mass flow rate may comprise determining a measured turbocharger revolution rate and a modeled turbocharger revolution rate. The determined charge air mass flow rate may be adjusted according to a difference between a measured turbocharger revolution rate and a modeled turbocharger revolution rate.

Method 500 begins at 502 by estimating and/or measuring engine operating conditions. Engine operating conditions may include engine speed and load, vehicle speed, pedal position (PP), throttle position, CAC temperature and pressure, engine temperature, compressor inlet and outlet pressure, turbine inlet and outlet pressure, intake temperature, exhaust temperature, air-fuel ratio, VVT, etc.

Next, at 504, a measured compressor pressure ratio and a measured turbocharger revolution rate may be inputted into a lookup table. A compressor pressure ratio is a pressure ratio across the compressor (e.g., compressor 174) of an exhaust gas turbocharger and is determined from pressure measurement values before and after the compressor and/or may be determined based on engine operating conditions determined at 502. A turbocharger revolution rate may be measured by a revolution rate sensor, for example. A characteristic field is stored in the engine controller in a lookup table, a 2D-look-up table for example, which has been produced on a test bench on which all values of the compressor pressure ratios and the turbocharger revolution rates have been run through under practical conditions.

Next, at 506, an open loop charge air mass flow rate may be determined. This may be determined via the characteristic field, for example, as a function of the measured compressor pressure ratio and measured turbocharger rate. Alternatively, the open loop charge air mass flow rate may be determined by an additional sensor.

Next, at 508, a modeled turbocharger revolution rate may be determined by a modeler, for example, from the compressor pressure ratio and an input air mass flow rate. Initially, the input air mass flow rate may be of various values, including the open loop air mass flow rate, for example. Subsequently, the input air mass flow rate may be a closed loop air mass flow rate, fed back to the modeler after its output in 512. The modeler may model the turbocharger revolution rate from a power balance model, for example. Specifically, the estimated turbine speed may be based on a load balance on a turbocharger shaft. Load balance may be based on, for example, a compressor pressure ratio, turbocharger inertia, turbocharger friction, etc.

a. $P_t = P_c + P_f + \frac{1}{2}\frac{d}{dt}\omega^2$, $P_f = P_f(\omega)$ power balance b. $P_c = \frac{1}{\eta_c}\dot{m}_a cp_a T_1([u])$, $u = \left(\left(\frac{P_2}{P_1}\right)^{\frac{\gamma-1}{\gamma}} - 1\right)$ compressor side c. $P_t = \dot{m}_e cp_e T_3 \eta_t([u])$, $u = \left(1 - \left(\frac{P_4}{P_3}\right)^{\frac{\gamma-1}{\gamma}}\right)$ turbine side d. $\omega = \sqrt{\frac{2}{I}\int(P_t - P_c - P_f)dt}$ square root of integral The modeler may derive an equation from power turbine equation a, which is based on compressor power, friction power, and an acceleration term to model a turbine revolution rate. I is turbocharger moment of inertia and ω is turbocharger revolution rate. Friction power is calculated as a function, e.g. mapping, of the current, measured turbocharger revolution rate, wherein turbocharger friction is proportional to turbocharger speed. These equations are used, in one example, to form the observer to reconstruct a turbine speed estimate that is tied to airflow, the reconstructed speed compared with measured speed to drive the flow estimate to a more accurate reading.

Compressor power is determined by a thermodynamic equation b wherein $\eta_c$ is adiabatic efficiency, $\dot{m}_a$ is air mass flow rate, $cp_a$ is specific heat, $T_1$ is intake side temperature, $$\frac{P_2}{P_1}$$

is the compressor pressure ratio, and γ is a specific heat ratio. Thermodynamic equation c for calculating turbine power has similar variables, except $T_3$ is exhaust side temperature and $$\frac{P_4}{P_3}$$

is the ratio across the turbine.

Equation d solves equation a for ω, the modeled turbocharger revolution rate.

Next, at 510, an offset value may be determined. The offset value is a scaled difference between the measured turbocharger revolution rate and the modeled turbocharger revolution. Additionally, the scaled difference between the measured turbocharger revolution rate and the modeled turbocharger revolution rate is limited by an upper and a lower limit value before being used as the offset value. In one example, the difference between the measured and estimated turbine speeds, i.e. the error between said values, is clipped at an upper threshold.

At 512, a closed loop charge air mass flow rate may be determined by adding the open loop charge air mass flow rate from 506 with the offset value from 510. The calculation of the closed loop charge air mass flow rate is carried out repeatedly, wherein in each case the previously obtained closed loop charge air mass flow rate is used in the modeling of the turbocharger revolution rate. In one example, the air mass flow rate may be determined repeatedly at a plurality of sample events of the electronic controller, the error being reduced successively by adjusting as estimate of the air mass flow rate. In this way, the modeler is using a corrected air mass flow rate to model the turbocharger revolution rate in a feedback loop.

Next, at 514, the open loop air mass flow rate may be updated based on the offset value. For example, an open loop working point may be set by means of the 2D lookup table that is updated by the observer illustrated in FIG. 4. Specifically, if $K(Nt-\tilde{N}t)>0$, the open loop charge air mass flow rate ΦOL is increased; if $K(Nt-\tilde{N}t)=0$, it is not updated; and if $K(Nt-\tilde{N}t)<0$, the open loop charge air mass flow rate ΦOL is reduced. With an increasing number of passes through the loop an ever more stable open loop charge air mass flow rate ΦOL results, updating the lookup tables with more accurate values for the actual charge air mass flow rate than the open loop charge air mass flow rate ΦOL.

At 516, engine conditions may be controlled based on the updated open loop charge air mass flow rate. For example, based on the corrected value for the charge air mass flow rate, an engine controller may have instructions stored in non-transitory memory to balance the fuel mass entering the engine, adjust the air-fuel ratio, adjust injection fuel timing and/or fuel injection amount, throttle angle, and the like. In another example, an engine controller may adjust an engine actuator responsive to an air mass flow rate that is not based on a mass airflow sensor, but rather based on an error between an estimated turbine speed and a measured turbine speed, such as the one calculated at 510.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system that can be carried out in combination with hardware, such as the various sensor and actuators of the engine system depicted in FIG. 1.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for determining charge air mass flow rate, comprising:
   an internal combustion engine operatively coupled to an engine controller;
   determining an open loop air mass flow rate from a characteristic field stored in the engine controller, wherein the open loop air mass flow rate is a function of a measured compressor pressure ratio and a measured turbocharger revolution rate;
   determining a modeled turbocharger revolution rate from the measured compressor pressure ratio and an input air mass flow rate;
   determining a closed loop air mass flow rate, wherein the closed loop air mass flow rate is calculated as the sum of the open loop air mass flow rate and an offset value;
   determining the closed loop air mass flow rate repeatedly, where in each case a previously obtained closed loop air mass flow rate is used in modeling the turbocharger revolution rate;
   updating the open loop charge air mass flow rate in a lookup table based on the closed loop air mass flow rate; and
   the engine controller having instructions in non-transitory memory to adjust fuel mass entering the engine based on the updated open loop charge air mass flow rate.

2. The method of claim 1,
   wherein the turbocharger revolution rate is measured with a revolution rate sensor and the compressor pressure ratio is a pressure ratio across a compressor of an exhaust gas turbocharger and is determined from pressure measurement values before and after the compressor of the exhaust gas turbocharger.

3. The method of claim 1,
   wherein the characteristic field is represented by a 2D lookup table that has previously been produced on a test bench.

4. The method of claim 1,
   wherein the modeled turbocharger revolution rate is calculated analytically using a model for the dependency of the turbocharger revolution rate on the compressor pressure ratio and charge air mass flow rate, via the engine controller.

5. The method of claim 1,
   wherein the offset value is a difference between the measured turbocharger revolution rate and the modeled turbocharger revolution rate multiplied by a scaling factor.

6. The method of claim 5,
   wherein the scaling factor is constant, process-controlled, or adaptive.

7. The method of claim 5,
   wherein the scaled difference between the measured turbocharger revolution rate and the modeled turbocharger revolution rate is clipped by an upper and a lower limit value before it is used as the offset value.

8. A method for controlling an engine via an electronic controller, comprising:
   adjusting an engine actuator responsive to an air mass flow rate, the air mass flow rate not based on a mass airflow sensor and based on an error between an estimated turbine speed and a measured turbine speed, the estimated turbine speed based on a power balance on a turbocharger shaft, the power balance based on compressor power, turbocharger inertia, and turbocharger friction.

9. The method of claim 8, wherein the compressor power is based on a compressor pressure ratio, the compressor pressure ratio is determined from a pressure before the compressor and a pressure after the compressor.

10. The method of claim 9, wherein the engine actuator is a fuel injection amount.

11. The method of claim 8, wherein the turbocharger friction is proportional to turbocharger speed.

12. The method of claim 11, wherein the air mass flow rate is determined repeatedly at a plurality of sample events of the electronic controller, the error being reduced successively by adjusting an estimate of the air mass flow rate.

13. The method of claim 8, wherein the engine is a turbocharged direct injection engine.

14. The method of claim 8, further comprising clipping the error at an upper threshold.

15. The method of claim 8, wherein the engine actuator is a throttle angle.

\* \* \* \* \*